(12) United States Patent
Aitto-Oja (10) Patent No.: US 12,151,899 B2
(45) Date of Patent: *Nov. 26, 2024

(54) HAULING TRANSPORTER, HAULING BEAM AND METHOD FOR LOADING

(71) Applicant: Simec Systems Oy, Oitti (FI)

(72) Inventor: Simo Aitto-Oja, Oitti (FI)

(73) Assignee: Simec Systems, Oitti (FI)

( * ) Notice: Subject to any disclaimer, the term of this patent is extended or adjusted under 35 U.S.C. 154(b) by 342 days.

This patent is subject to a terminal disclaimer.

(21) Appl. No.: 17/475,459

(22) Filed: Sep. 15, 2021

(65) Prior Publication Data

US 2023/0084884 A1 Mar. 16, 2023

(51) Int. Cl.
*B65G 25/02* (2006.01)
*B65G 13/12* (2006.01)
*B65G 67/20* (2006.01)

(52) U.S. Cl.
CPC .............. *B65G 25/02* (2013.01); *B65G 13/12* (2013.01); *B65G 67/20* (2013.01); *B65G 2207/30* (2013.01)

(58) Field of Classification Search
CPC ...................................................... B65G 25/02
USPC ...................... 198/750.14, 750.2, 774.4, 775; 414/525.9
See application file for complete search history.

(56) References Cited

U.S. PATENT DOCUMENTS

| | | | | |
|---|---|---|---|---|
| 2,973,856 A * | 3/1961 | Brooks | ............... | B60P 1/365 414/525.9 |
| 3,451,532 A * | 6/1969 | Manterfield | ........... | B65G 25/02 198/774.4 |
| 3,777,916 A * | 12/1973 | Lutz | .................... | B60P 1/36 414/525.9 |
| 3,871,534 A * | 3/1975 | Bursk | .................. | B60P 1/38 414/525.9 |
| 4,009,774 A * | 3/1977 | Lutz | .................... | B65G 25/02 414/525.9 |
| 5,409,102 A * | 4/1995 | De Vries | ............... | B65G 25/02 198/774.4 |
| 5,727,669 A * | 3/1998 | Rich, Jr. | ................ | B65G 25/02 414/749.5 |
| 6,675,956 B1 * | 1/2004 | Foster | ................. | B65G 25/065 414/525.9 |
| 7,398,873 B2 * | 7/2008 | Foster | ................... | B65G 25/02 198/750.2 |
| 7,815,037 B2 * | 10/2010 | House | ................. | B65G 25/065 198/750.2 |
| 2024/0051762 A1 * | 2/2024 | Aitto-Oja | .............. | B65G 67/24 |

FOREIGN PATENT DOCUMENTS

FI 127072 B 10/2017
KR 101183183 B1 9/2012

* cited by examiner

*Primary Examiner* — James Keenan
(74) *Attorney, Agent, or Firm* — Meunier Carlin & Curfman LLC

(57) ABSTRACT

According to an example aspect of the present invention, there is provided a hauling beam, which can be placed in connection with, a load to be moved, so that by moving the hauling beam the load can be moved. The hauling beam can be moved, for example, by dragging. The hauling beam described herein makes it possible to lift the load to be transferred on the rollers, wheels or rolls and to transfer the load.

14 Claims, 5 Drawing Sheets

HAULING TRANSPORTER, HAULING BEAM AND METHOD FOR LOADING

FIELD

The invention concerns a hauling beam lifting mechanism suitable for moving palletized loads and heavy loads such as cargo containers used in containerization. In addition, the invention relates to a transporter comprising such a hauling beam and a method for transferring a load on loading.

BACKGROUND

The transfer of heavy loads requires durable and reliable equipment. Various loading methods and mechanisms have been developed for the transfer of heavy loads. Typically, the loads are assembled on a transfer system and run along a loading line specifically made for them. The loading equipment used are large and at least partly solid structures. In addition to transfer lines, means are needed to transfer the load from the line to a means of transport carrying the load, such as a container, trailer or train. A trailer of a truck can be loaded and unloaded with a forklift. This is slow, but frequently used, especially for larger goods. In addition, in order to prevent damage to the trailer or container or in order to support a single or few pieces of goods, a pallet may be used in each truck-mounted load unit. Pallets are mainly used for collecting smaller goods or packages to larger palletized units for transport or to support the goods during transport. They offer standardized sized load or package and a sturdy support for handling and transport. In modern logistics, loading and unloading time of transport vehicles like trucks or trains should be minimized. Therefore, it would be advantageous to collect a load dimensioned for a container or a truck bed in advance and move it as a single unit to the container or other transport unit.

Publications KR-10-1183183 and FI 127072 disclose hauling beams and methods for transferring heavy loads. These are obviously applicable for other types of loads also.

SUMMARY OF THE INVENTION

The invention is defined by the features of the independent claims. Some specific embodiments are defined in the dependent claims.

According to a first aspect of the present invention, there is provided a hauling beam comprising at least two parallel slats having two parallel sides and two opposite ends, the slats being set at a distance from each other so that here is a gap between the adjacent parallel sides, at least one support beam set on the parallel slats so that the slats and the support beam are configured to be movable longitudinally with respect to each other, a support arm movably attached to the support beam, an axle and a roller coaxially attached to the support arm, and a wedge placed between the parallel slats and having a slot for the roller and a wedge tongue for connecting to the axle upon longitudinal movement of the parallel slats and the support beam.

Some further aspects of the invention that are combinable with the first aspect as single features or in any combination are:
- at least one actuator configured to cause a tensile force on slats or the support beam to cause the longitudinal movement,
- the parallel slats are configured to be joined successively so that at least surfaces of the connected parallel slats facing the support beam are flat,
- a connector placed between the parallel slats and configured to connect two support beams so that the surface of the connected support beams facing away from the parallel slats is flat,
- the connector is a flat connector plate.
- the hauling beam comprises at least two successively end to end connected hauling beam elements According to a second aspect of the present invention, there is provided a hauling transporter comprising a frame, at least one hauling beam supported on the frame and comprising at least two parallel slats having two parallel sides and two opposite ends, the slats being set at a distance from each other so that here is a gap between the adjacent parallel sides, a support beam set on the parallel slats so that the slats and the support beam are configured to be movable longitudinally with respect to each other, a support arm movably attached to the support beam, an axle and a roller coaxially attached to the support arm, and a wedge placed between the parallel slats and having a slot for the roller and a wedge tongue for connecting to the axle upon longitudinal movement of the parallel slats and the support beam and a step beam supported on the frame and configured to be movable longitudinally along the frame parallel to the hauling beam.

According to the third aspect of the invention, there is provided a method for loading goods comprising steps of
- setting at least one piece of goods on the hauling beams and step beams,
- raising at least one hauling beam,
- forwarding at least one step beam, and
  - alternatively in any sequence:
  - lowering at least one hauling beam,
  - forwarding at least one step beam,
  - withdrawing at least one step beam.

EMBODIMENTS

Some of the mechanical parts of the invention are preferably made of flat material, preferably steel. In this context flat material is bar, sheet or full profile having correlation of thickness to width of at least 1:3, preferably greater like at least 1:5 and having an even thickness. There may be grooves, indentations, ridges, protrusions or similar formations on the surfaces of the flat material.

A hauling beam is referred to herein as a beam used to move goods, cargo, loads or the like, typically loads consisting of pallets, single goods or combinations thereof. The hauling beam can be placed in connection with, typically underneath or below, a load to be moved, so that by moving the hauling beam the load can be moved. The hauling beam can be moved, for example, by dragging. Hauling refers to grabbing, dragging, dragging, retouching, cumbersome carrying, or pulling. The hauling beam described herein makes it possible to lift the load to be transferred on the rollers, wheels or rolls and to transfer the load by means of them. The vertical dimensions (height) of the hauling beam can be dimensioned to be very small, which enables using most the height of a loading space.

When long loads or equipment are handled, the dimensions of the hauling beam become long, or large. This causes high stresses on the structure if the surface on which the loading is performed is even slightly uneven. Also, the length of the hauling beam can't be changed after it is assembled and transporting long items is tedious and expensive. A modular structure wherein the hauling beam is constructed of hauling beam modules connected to each other by joints allowing the relative movement of the hauling beam modules in the height direction (in direction crosswise to the longitudinal direction of the hauling beam) allows the hauling beam to accommodate to the profile of the surface on which it is operated. At least some embodiments of the hauling beam utilize parts made of flat rectangular bars or sheets providing small structural height and high flexibility in crosswise direction of the hauling beam.

Figure 8:
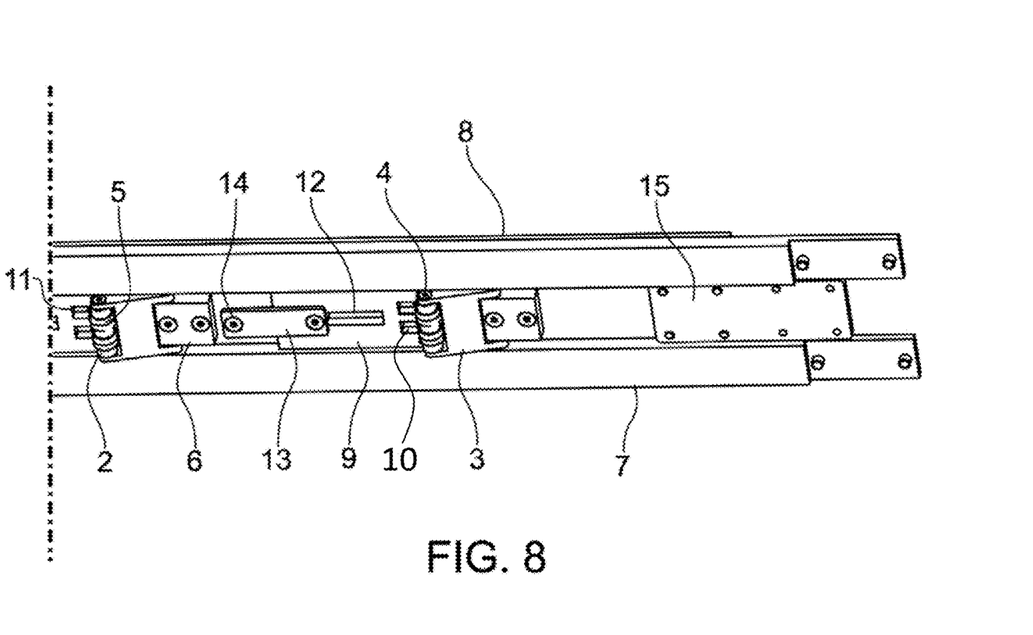
FIG. 8 is a perspective view of a hauling beam in accordance with at least some embodiments of the present invention.

FIGS. 1-7 illustrate a hauling beam in accordance with at least some embodiments of the present invention. FIG. 8 provides further view of the hauling beam in order to better understand its construction and function.

As can be seen from FIGS. 1, 2 4 and 5 the hauling beam 1 is a longitudinal beam having a moderate height and larger width, making it a thin flat beam. This enables very small operating height, which is beneficial for optimizing the use of the height of a loading space, for example a container. Lifting of the hauling beam 1 is accomplished by rollers 2 mounted by an axle 4 on support arms 3. The axle 4 may be provided with a slip ring 5 or rings on the sides of the rollers. The support arm 3 has a fork at each end and the axle 4 is mounted between the branches of the fork at one end of the support arm 3. At the other end of the support arm 3 the fork is connected to a mounting block 6, for example by pins connecting the support arm 3 to the mounting block 6 so that the support arm 3 can pivot around its mounting point. The mounting block 6 is attached to a support beam 8 by screws. On either side of the mounting block 6 are parallel slats 7. The width of the slats 7 and the distance between them is dimensioned so that the outer dimensions of the parallel slats 7 match the width of the support beam 8. Wedges 9 connect the parallel slats 7. The wedges 9 set the distance between the parallel slats 7. The wedges 9 are attached to the parallel slats 7 by welding and the parallel slats 7 and the wedges 9 form a ladder structure. The wedges 9 have two roller grooves 10 and three wedge tongues 11 that face the rollers 2. The number of the wedge tongues and roller grooves may vary and is dependent of how many rollers are used. In this example, two rollers need two roller grooves and three tongues, several other setups can be contemplated. The wedge tongues have a wedge shape that slopes away from the support beam 8 mounted on the parallel stats 7. The wedges 9 have also a central guide groove 12 for a guide screw 14 that holds a tie 13 in place. The tie 13 is connected to the support beam 8 through the guide groove 12 and the guide screw 14 a screw at its opposite end. The tie holds the support beam and the parallel slats 7 and wedges 9 together and guides the movement sideways.

Figure 1:
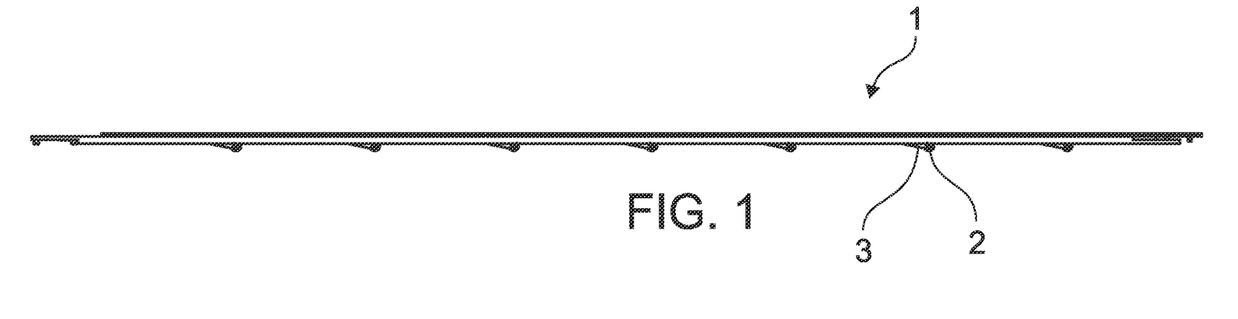
FIG. 1 illustrates a hauling beam from one side in accordance with at least some embodiments of the present invention.
Figure 2:
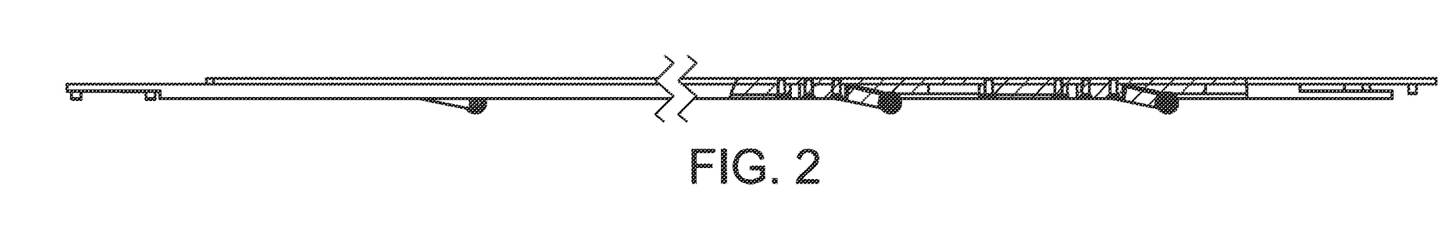
FIG. 2 is a partial cross section of the hauling beam of the FIGURE.
Figure 3:
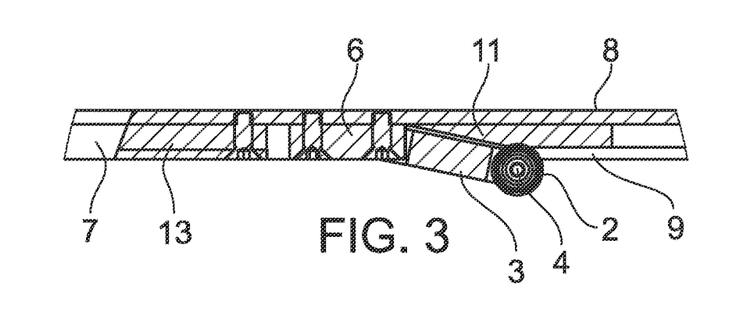
FIG. 3 is an enlarged view of a detail of FIG. 2.
Figure 4:
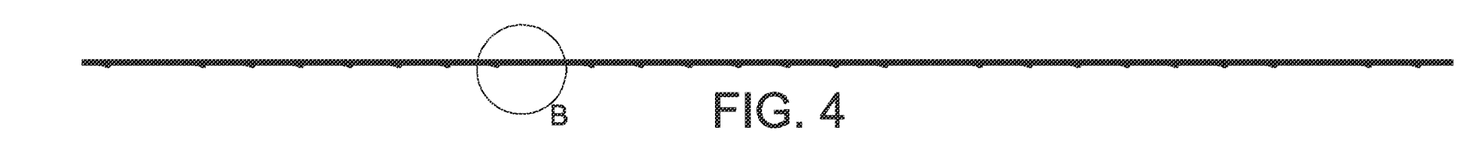
FIG. 4 is a side view of the hauling beam of FIG. 1 showing a detail B.
Figure 5:
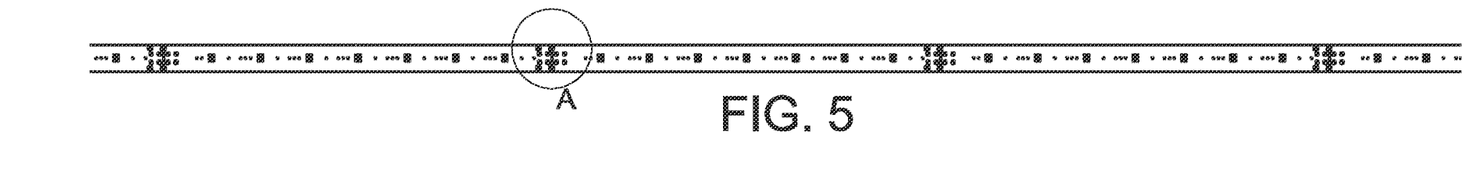
FIG. 5 is a top view of the hauling beam of FIG. 1 and shows a detail A.

The purpose of the hauling beam is to enable moving loads by lifting them on roller or wheels. In the above hauling beam 1 the lifting is performed by relative movements of support beam and the structure formed of parallel slats and wedges. The movement is provided by drawing (tensioning) the support beam 8. When the parallel slats 7 and wedges 9 are held stationary and the support beam is drawn in the direction of wedge tongues 11, the slip rings 5 engage the wedge tongues 11 and force the rollers 2 downwards. The support beam 8, parallel slats with wedges and all of the rest of the hauling beam is lifted on the rollers 2. This lifting may be a sole operation or the hauling beam 1 can be moved on the rollers 2 in order to move a load on the support beams 8. It is preferable to move the support beam 8 as the parallel slats 7 rest on a supporting surface. However, the operation and structure (direction of the wedges) may be reversed, if desired. This may be reasonable in situations when a sliding surface, rollers or such can be provided under the parallel slats 7, for example in a loading device or platform.

The hauling beam described above can be used as a single beam or in combination of multiple parallel beams. However, a modular structure where two or more hauling beam modules are connected to a longer beam provides benefits. Transport of shorter modules is easy and length of a hauling beam can be adjusted as desired. The joints between the modules provide further flexibility for adjusting to uneven ground, for example on pushing loads to containers or vehicles. Basically, each hauling beam module is the one described above. In order to join the modules together, joining elements have to be provided.

Figure 6:
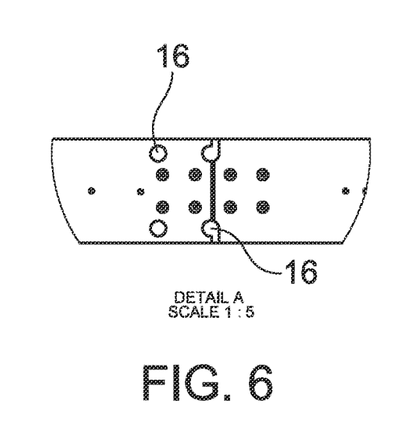
FIG. 6 is an enlarged view A of the FIG. 5.
Figure 7:
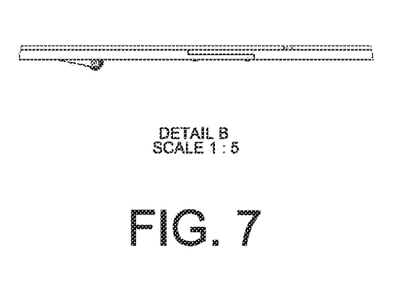
FIG. 7 is an enlarged view B of the FIG. 4.

Joining elements are need for parallel slats 7 and support beams both. As all other parts and elements of the hauling beam module are connected to these elements, structural and operational combination is achieved for whole structure. FIG. 6 shows the joint. Please refer to FIG. 8 also. Joint plates 15 placed under the support beam 8 and between the parallel slats 7 join the support beams of successive support beams. As the thickness of the successive support beams is the same, the upper surface of the joint support beams 8 is flat and no step between is formed on the upper surface. In here, screws are used for fixing elements. The joint plate 15 is flat. The joint plate may have grooves or other profiled forms, but a flat plate provides more flexibility as it bends easily. A flat plate can be used as the hauling beam is operated by using tensile force. Even a thin plate of sheet metal can withstand relatively high loads compared to its low rigidity in bending directions or against compressive loads. This same phenomenon is utilised throughout the construction wherein tensile forces are used to cause movements against high loads.

The parallel slats are joined by tongue joint secured by screws. This is a simple joint and provides the strength needed. A person skilled in the art can contemplate other joints, if so desired. In order to facilitate assembly of the hauling beam, the support beam is provided with holes 16, through which the screws attaching the parallel slats together may be assembled and tightened.

In order to fully utilize the modular structure, the hauling beam is assembled by screws. However, in a solid mounting, or for other reasons, other joining and assembling methods such as welding may be used. The slip rings are optional and a freely rotating axle or low friction surface coating may be used instead. As rollers, ball bearings or other type of bearings are usable, but the choice of rollers depends on required loadability and surface conditions.

Figure 9:
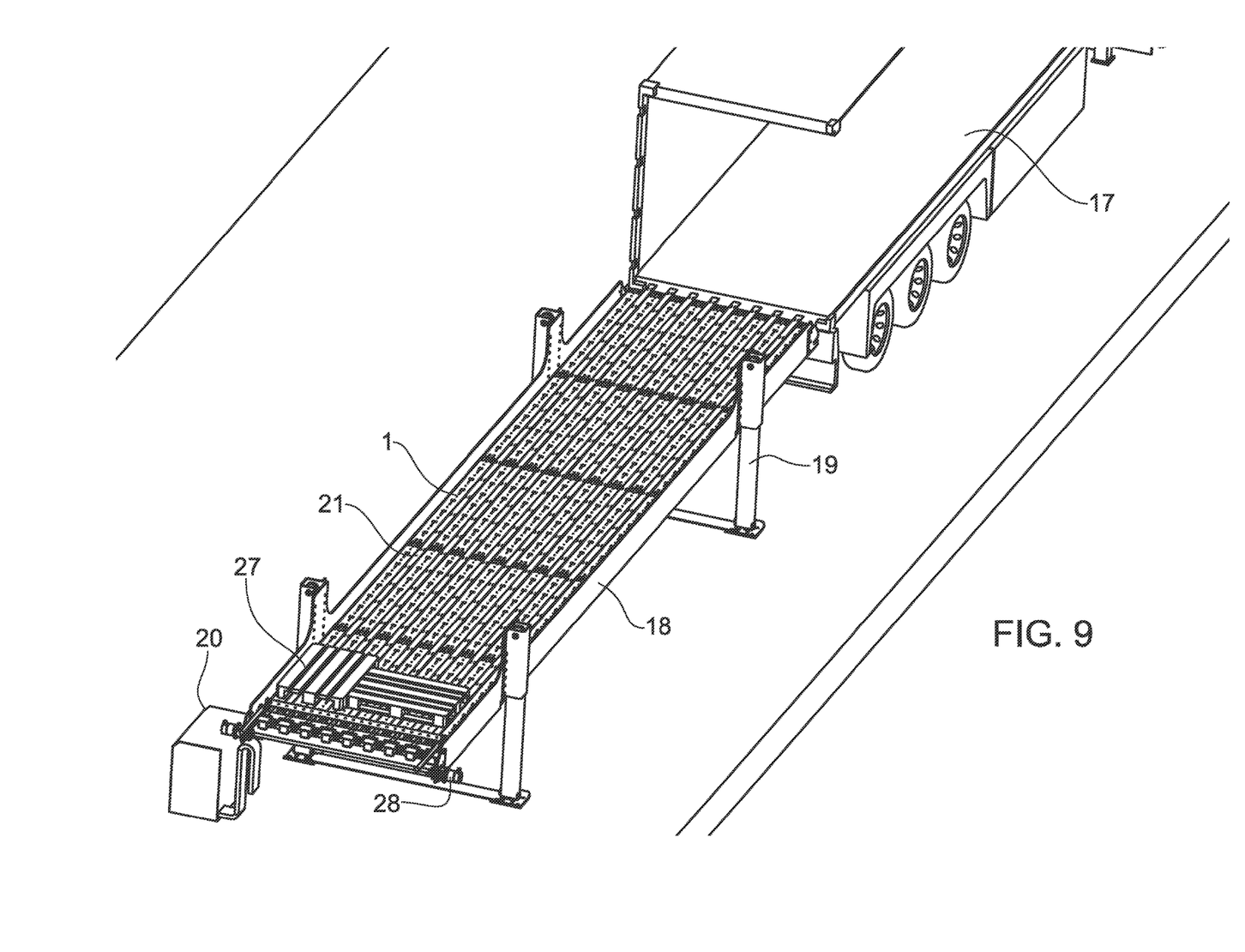
FIG. 9 is a schematic view of a hauling transporter according to at least some embodiments of the invention.
Figure 10:
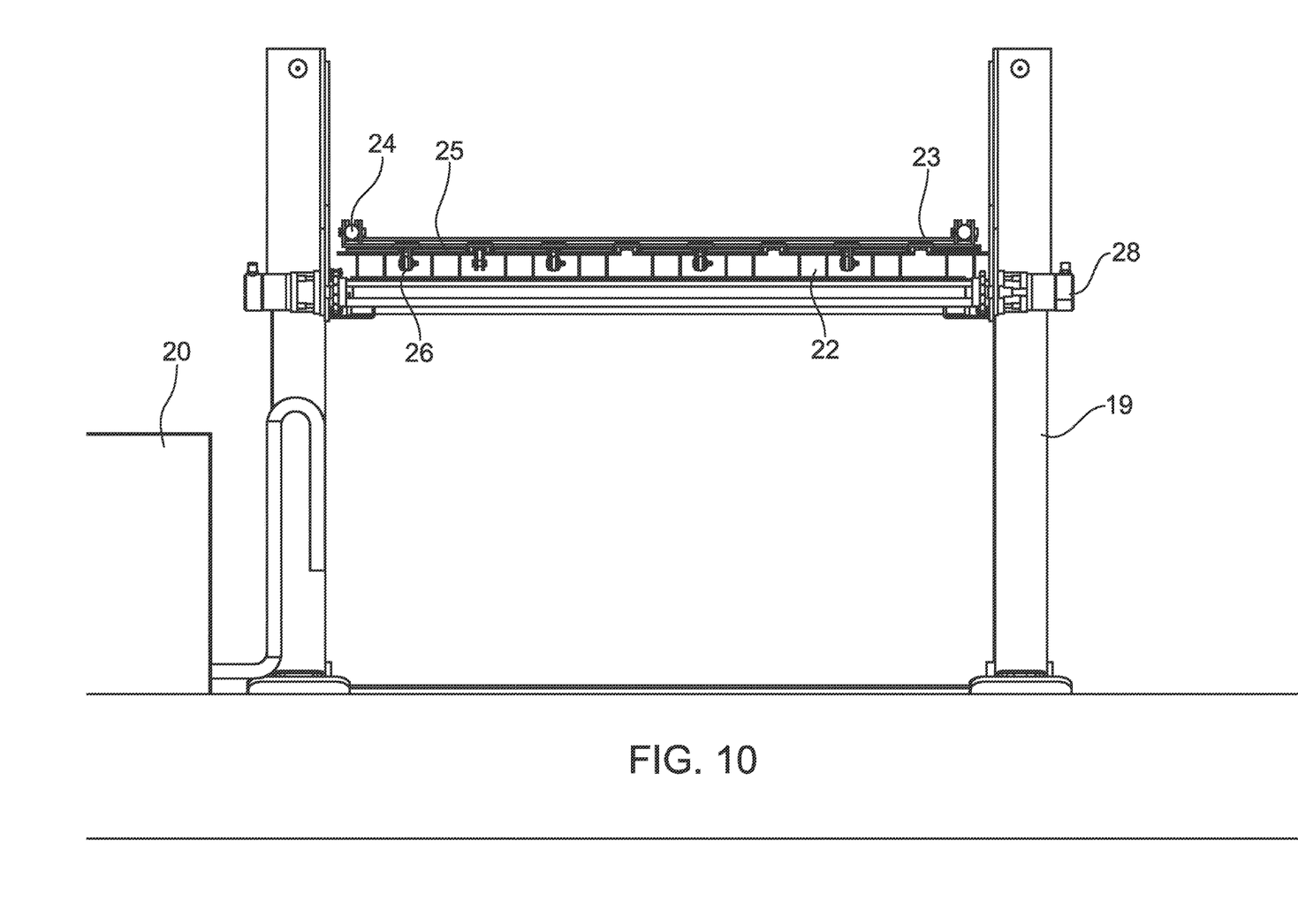
FIG. 10 shows the hauling transporter of FIG. 9 from the loading end.

FIGS. 9 and 10 depict a hauling transporter for forming loads and transporting them to a vehicle or other transport space. In here a trailer 17 is used as an example of a transport space. The hauling transporter comprises a frame 18 set on adjustable legs 19. The height of the legs 19 and consequently the height and angle of the platform may be changed by raising or lowering each leg as needed. In this way the transporter can accommodate to different loading heights and angles. Hydraulic cylinders or other known methods can do the adjustment. A power unit 20 is provided for using the actuators as needed, for example by hydraulic, pneumatic or electrical power. The frame 18 comprises rigid beams 22 for supporting a surface on which a set of hauling beams 1 and step beams 21 are arranged. The step beams 21 and the hauling beams may be set in various ways. There may be several hauling beams side by side, or step beams side by side or step beams and hauling beams side by side. The number of independently operated hauling beams varies according to how complicated movements must be achieved.

The hauling beams 1 are connected to a cross plate 25, through a connector plates attached to actuator cylinders 26. Each actuator cylinder 26 is connected to two hauling beams 1 through a connector plate and provides lifting of these cylinders. When a cylinder is actuated, two hauling beams 1 are lifted or lowered. This allows lifting of limited areas of the hauling transporter as desired. The step beams 21 are flat beams having rollers under them for providing movement, but do not comprise a lifting mechanism. The step beams are connected to step plate 23 through step cylinders 24. The step cylinder move in their longitudinal direction as a unit.

The hauling transporter is used for collecting a load of goods, such as pallets 27, for transport and loading them to a transport space. When a load to be transported is collected, the space in the container or trailer should be utilized as well as possible. Therefore it is necessary to position pallets (or other goods) on transporter and to transport space as effectively as possible. This is depicted in FIG. 9 by showing two pallets 27 in different positions. Also, a load may comprise many types of goods requiring different footprint. Now, by using the hauling transporter, a pallet 27 can be lifted on the hauling transporter and forwarded gradually along the hauling transporter. This is done by lifting the pallets in sections. For example, hauling beams 1 under a first pallet are lifted by operating the actuator cylinders 26, raising the hauling beams and pallets 27 on them from the step beams 21. Now, when step beams 21 are forwarded by step cylinders 24, pallets that are not lifted, move forward. Next, hauling beams 1 under the forwarded pallets are lifted and step beams 21 withdrawn. Now, the same pallets may be moved further using the same process or other pallets may be moved in similar way. Of course, all pallets may be forwarded simultaneously. This stepwise forwarding process is continued until a load to be transported is ready for transfer to the trailer 17.

On loading, the set of hauling beams 1 and step beams 21 are pushed on the bed of the trailer 17. The step beams move on their rollers and hauling beams on their rollers. The rollers and mechanism of the hauling beams may be dimensioned so that the rollers rest on the supporting surface continuously or hauling beams may be risen slightly if they are dimensioned to fall below the surface of the step beams. A chain actuator 28, that is depicted herein as sprocket and electric motor, provides the pushing movement. Chain itself is not shown, but it is connected to the cross plate 25. The cross plate is connected to the step plate through the step cylinders 24. When step beams and hauling beams are pushed as far as required, the apparatus is retrieved from the trailed by using the forwarding action backwards.

The load rests always during movement on large area, whereby the moving elements can be constructed to be light and small. The height of the apparatus is low, whereby empty space on top of the load can be avoided. Small height of the hauling and step beams makes removing the pallets or other goods at the end of the beams reliable as tilting is minimal. An angled ramp of rigid plate or rollers may be used for further reducing tilting. Further, the unloading phase may include a step or steps wherein the pallets or other goods leaving the transporter are pushed towards previous pallet or wall of the transport space in order to remove gaps between the goods as much as possible. This is important for filling the whole floor surface of the transport space. Leaving too large gaps may lead to situation wherein the whole load doesn't fit into the transport space and need to be pushed by for example a truck further inwards in the transport space. This may easily damage the pallets and/or goods and very probably the bed of the transport space.

The hauling transporter may be used for different purposes as a loader or mounted on vehicles. The number of the hauling beams and hauling beam modules can be changed according to the capacity and dimensions needed to handle the particular loads. The hauling beam can be used upside down so that the rollers face upwards. This configuration is usable for loading flat sheets, for example metal sheets or wooden product like veneers, beams of boards, construction boards and such.

The lifting height of the hauling beam according to the embodiments can be, for example, about 10 mm. The lifting height can be determined according to the requirements of the application. According to one embodiment, the beam lifting mechanism is operated by a hydraulic cylinder. In the lifting mechanism according to the embodiments, the force of the hydraulic cylinder can be multiplied by a factor of 2 to 10. This applies also to other actuators. Any actuator providing reciprocating linear movement is applicable, for example a linear screw, pneumatic cylinder, chain and sprocket system or a toothed rail.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The invention can be used for transport and loading of goods

REFERENCE SIGNS LIST 1 hauling beam
2 roller
3 support arm
4 axle
5 slip ring
6 mounting block
7 parallel slats
8 support beam
9 wedge
10 roller groove
11 wedge tongue
12 guide groove
13 tie
14 guide screw
15 joint plate
16 hole
17 trailer
18 frame
19 leg
20 power unit
21 step beam
22 beam
23 step plate
24 step cylinder
25 cross plate
26 actuator cylinder
27 pallet
28 chain actuator

The invention claimed is:
1. A hauling beam comprising:
at least two parallel slats having two parallel sides and two opposite ends, the at least two parallel slats being set at a distance from each other so that there is a gap between the adjacent parallel sides,
at least one support beam set on the at least two parallel slats so that the at least two parallel slats and the at least one support beam are configured to be movable longitudinally with respect to each other,
a support arm movably attached to the at least one support beam,
an axle and a roller coaxially attached to the support arm, and
a wedge placed between the at least two parallel slats and having a slot for the roller and a wedge tongue for connecting to the axle upon longitudinal movement of the at least two parallel slats and the at least one support beam.
2. The hauling beam according to claim 1, further comprising at least one actuator configured to cause a tensile force on the at least two parallel slats or the at least one support beam to cause the longitudinal movement.
3. The hauling beam according to claim 1, wherein at least one of the at least two parallel slats or the at least one support beam is made of flat material, comprising a full profile having a correlation of thickness to width of at least 1:3 and the support beam having an even thickness.
4. The hauling beam according to claim 1, wherein the at least two parallel slats are configured to be connected by a flat connector plate so that at least surfaces of the connected at least two parallel slats facing the at least one support beam are flat.
5. The hauling beam according to claim 1, further comprising a connector placed between the at least two parallel slats and configured to connect two support beams so that a surface of the connected support beams facing away from the at least two parallel slats is flat.
6. A hauling beam comprising:
at least two hauling beam elements comprising:
at least two parallel slats having two parallel sides and two opposite ends, the at least two parallel slats being set at a distance from each other so that there is a gap between the adjacent parallel sides,
at least one support beam set on the at least two parallel slats so that the at least two parallel slats and the at least one support beam are configured to be movable longitudinally with respect to each other,
a support arm movably attached to the at least one support beam,
an axle and a roller coaxially attached to the support arm, and
a wedge placed between the at least two parallel slats and having a slot for the roller and a wedge tongue for connecting to the axle upon longitudinal movement of the at least two parallel slats and the at least one support beam, and
wherein the at least two hauling beam elements are connected end to end with each other.
7. The hauling beam according to claim 6, wherein the at least two parallel slats are configured to be joined by a flat connector plate so that at least surfaces of the connected at least two parallel slats facing the at least one support beam are flat.

8. The hauling beam according to claim 6, further comprising a connector placed between the at least two parallel slats and configured to connect two support beams so that a surface of the connected support beams facing away from the at least two parallel slats is flat.

9. A hauling transporter comprising a frame,
at least one hauling beam supported on the frame and comprising:
   at least two parallel slats having two parallel sides and two opposite ends, the at least two parallel slats being set at a distance from each other so that here is a gap between the adjacent parallel sides,
   a support beam set on the parallel slats so that the at least two parallel slats and the support beam are configured to be movable longitudinally with respect to each other,
   a support arm movably attached to the support beam,
   an axle and a roller coaxially attached to the support arm, and
   a wedge placed between the at least two parallel slats and having a slot for the roller and a wedge tongue for connecting to the axle upon longitudinal movement of the at least two parallel slats and the support beam,
and a step beam supported on the frame and configured to be movable longitudinally along the frame parallel to the at least one hauling beam.

10. The hauling transporter according to the claim 9, further comprising two hauling beams configured to be raised in a pairwise manner.

11. The hauling transporter according to claim 10, further comprising at least two step beams configured to be moved longitudinally together.

12. The hauling transporter according to claim 11, further comprising a cross beam for pushing all the hauling beams and the step beams together.

13. A method for loading goods by the hauling transporter according to claim 9, comprising the steps of:
   setting at least one piece of goods on the at least one hauling beam and the step beam,
   raising the at least one hauling beam,
   forwarding the step beam, and
   alternatively in any sequence:
      lowering the at least one hauling beam,
      forwarding the step beam,
      withdrawing the step beam.

14. The method according to claim 13, further comprising the steps of:
   forwarding a load on a transport space on top of the hauling beam and the step beam, and
   withdrawing the hauling beam and the step beam by first withdrawing the hauling beam, raising the hauling beam, withdrawing the step beam and continuing until the hauling beam and the step beam are withdrawn from the transport space.

* * * * *